United States Patent [19]

Fritz et al.

[11] Patent Number: 4,922,779
[45] Date of Patent: May 8, 1990

[54] SLITTING SHEARS

[75] Inventors: Manfred Fritz, Erkrath; Hans Scheel, Velbert, both of Fed. Rep. of Germany

[73] Assignee: SMS Schloemann-Siemag Aktiengesellschaft

[21] Appl. No.: 185,095

[22] Filed: Apr. 22, 1988

[30] Foreign Application Priority Data

Apr. 23, 1987 [DE] Fed. Rep. of Germany ....... 3713546

[51] Int. Cl.$^5$ ............................................. B23D 19/06
[52] U.S. Cl. ..................................... 83/503; 83/481; 83/664; 83/698
[58] Field of Search .............. 83/343, 344, 345, 425.3, 83/425.4, 479, 481, 482, 500, 503, 501, 507, 508.3, 664, 698

[56] References Cited

U.S. PATENT DOCUMENTS

| 2,706,524 | 4/1955 | Hall ...................................... 83/503 |
| 3,545,326 | 12/1970 | Madachy ............................. 83/503 |
| 3,863,537 | 2/1975 | Huelsman ............................ 83/504 |
| 4,061,063 | 12/1977 | Brush .................................... 83/345 |
| 4,756,219 | 7/1988 | Pohl et al. ............................ 83/344 |

FOREIGN PATENT DOCUMENTS 383388  5/1952  Fed. Rep. of Germany ........ 83/343

Primary Examiner—Hien H. Phan
Attorney, Agent, or Firm—Toren, McGeady & Associates

[57] ABSTRACT

Slitting shears for sheets and strips of metal. The shears include knife rollers which support circular knives and are adjustable for adjusting the overlap of the knives. The gaps between the knives are adjustable by means of spacer sleeves arranged on the rolls between the circular knives. The slitting shears further include a bending control unit for the knife rollers for keeping constant the adjusted knife overlap and knife gaps. The bending control unit makes it possible to prevent positional changes of the cutting edges of the circular knives under load, so that cut edges without burrs can always be produced independently of the cutting forces. Bending of the knife rollers can be compensated in a controlled manner by sensing the bending of a knife roller.

15 Claims, 4 Drawing Sheets

SLITTING SHEARS

BACKGROUND OF THE INVENTION

1. Field of the Invention

The present invention relates to slitting shears for sheets and strips of metal. The shears include knife rollers which support circular knives and are adjustable for adjusting the overlap of the knives. The gaps between knives are adjustable by means of spacer sleeves inserted between the circular knives.

2. Description of the Prior Art

An accurate cutting edge adjustment is of great importance for the quality of slitting shears. It has been found that, depending on the lateral deflection of the cut strips and particularly in the case of thick sheets or strips of high-strength steel, a more or less distinct formation of burrs occurs even when the cutting edges are correctly adjusted. This formation of burrs is due to a change of the position of the cooperating circular knives during cutting.

It is, therefore, the primary object of the present invention to further develop slitting shears which always produce cut edges which are free of burrs independently of the cutting forces.

SUMMARY OF THE INVENTION

In accordance with the present invention, the slitting shears include a bending control means for the knife rollers for keeping constant the adjusted knife overlap and knife gaps.

Thus, the present invention utilizes the finding that the bending of the knife rollers due to the cutting forces is the reason for the load-related positional changes of the cutting edges.

A bending control has long been known in connection with work rolls and support rolls in rolling mills for rolling flat material. The bending control has the purpose to provide a certain contour to the roll gap On the other hand, the use of a bending control means for knife rollers of slitting shears in accordance with the present invention serves an entirely different purpose, i.e., to maintain the relative position of cooperating circular knives during cutting.

Power units are used for applying bending moments to the knife rollers. These power units act directly on the necks of the knife rollers. Accordingly, the chock for supporting the necks of the knife rollers must be tiltable, so that end pressures in the bearings due to bending moments are avoided.

However, if the bearings are of suitable construction, it is also possible to have the power units act through lever arms on chocks of the knife rollers, wherein the chocks are arranged one above the other. In this case, the necks of the knife rollers are fixedly clamped in the chocks for the transmission of bending moments along a defined length.

Hydraulic bending cylinders are preferred power units for applying the bending moments. For applying a positive bending moment, the bending cylinder or cylinders must only provide a spreading force. However, if the bending cylinder or cylinders are double-acting, the bending cylinder or cylinders can be used on the knife side of the shears for spreading apart the knife shafts during the exchange of knives after the chocks have been pulled off in the known manner on the service side. As a result, the exchange of knives and the axial adjustment of the circular knife to the desired strip widths are facilitated.

The bending cylinders may be connected to the lever arms of chocks arranged one above the other through joint bolts connected to the cylinders and the piston rods. However, the bending cylinders may also be fixed between the lever arms of chocks arranged one above the other and be provided with piston rods which are movable in opposite directions inwardly or outwardly of the cylinders.

The knife rollers may be adjustable by means of two vertically extending adjusting spindles having oppositely directed threads, wherein the female thread in chocks located one above the other are arranged at as great a distance as possible from the corresponding power units. The imaginary axes of rotation about which the chocks must carry out tilting motions due to the bending forces extend through these female threads.

In accordance with a preferred embodiment of the invention, the knife rollers are adjustable by means of eccentric bushings which are rotatable in the chocks. The chocks which are located one above the other are connected to each other in a tension-proof or compression-proof manner in such a way that they can carry out tilting motions for transmitting positive or negative bending moments. In the normal situation, i.e., for transmitting positive bending moments to the knife shafts, it is recommended to connect the chocks by means of two pairs of tension rods in a tension-proof manner. In the area of the tension rods arranged at the greatest distance from the corresponding power units, at least one spacer piece permitting the tilting motions is provided between the chocks. The tension rods arranged at the shortest distance from the corresponding power units extend with one end thereof through a compression spring which is arranged between one of the chocks and the clamping nut of the tension rod.

For rotating the eccentric bushings, the bushings are provided with gear rings which mesh with upper and lower adjusting screws which are aligned and mounted in the chocks. The adjusting screws are movably coupled to each other. As a result, the engagement conditions between the adjusting screws and the gear rings of the eccentric bushings are not influenced when the chocks carry out tilting motions under the influence of the power units of the bending control means for the knife rollers.

The adjusting screws are preferably driven by a motor only on one side of the knife rollers. The lower adjusting screw is connected through bevel gears to a longitudinal shaft which, in turn, is connected through bevel gears to the lower adjusting screw on the other side of the knife rollers. Thus, a synchronous operation of the adjusting devices on both sides is ensured by using only one adjusting motor which preferably is a gear motor.

If the chock on the service side including the bearings are horizontally movable in the known manner to such an extent that the necks of the knife rollers are free for the assembly of the circular knives, the motor drive for the adjusting screws must be arranged on the drive side of the knife rollers, wherein the longitudinal shaft has on its side on the service side a multiple-groove toothing which can be coupled with and uncoupled from a coupling sleeve in the lower chock as a result of the sliding motions of the chocks. Thus, the chocks on the service side do not require their own adjusting motor because they are slidable for releasing the necks of the knife rollers.

It is also within the scope of the present invention to slidably guide the chocks on the service side on a swingable platform with a support surface. In a first swinging position, the support surface of the platform is in alignment with a stationary support surface of the base frame of the slitting shears and, in the second position swung by 90°, the support surface of the platform is located outside of the vertical middle plane of the knife rollers. Since the chocks on the service side can be swung to the side in this manner, more room is available for the operating personnel who carry out the knife exchange and the axial adjustment of the circular knives.

Instead of a random control of the bending cylinders, it is advantageous if the bending of a knife roller is determined by means of a displacement pickup and the bending of the knife rollers is compensated in the controlled manner by means of a control unit.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

DETAILED DESCRIPTION OF THE INVENTION

Figure 1:
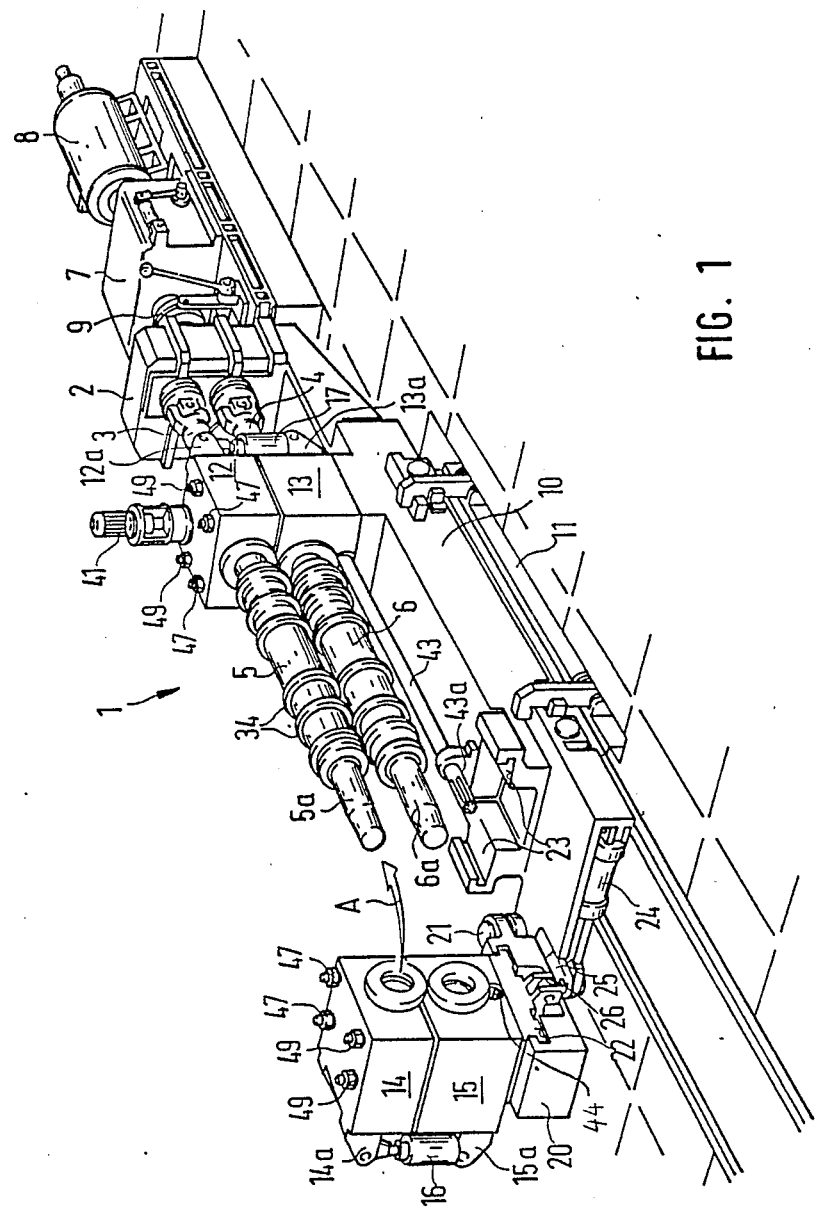
FIG. 1 is a perspective view of the slitting shears according to the present invention including drives.

The slitting shears 1 illustrated in FIG. 1 include a pin gear unit 2 from which the knife rollers 5, 6 are driven through articulated spindles 3, 4. In front of the pinion gear unit is arranged a stationary gear unit 7 and an electric motor 8. A manually operated coupling 9 is provided between the pinion gear unit 2 and the stationary gear unit 7.

The slitting shears 1 further include a machine bed 10 which is tightly clamped onto a base frame 11 in the conventional manner. The knife rollers 5, 6 are supported on the drive side by means of chocks 12, 13 which are placed one above the other. Chocks 14, 15 on the service side are illustrated removed and swung away from the knife roller necks 5a, 6a. The chocks have pairs of lever arms 12a, 13a and 14a, 15a, respectively. Pairs of hydraulic bending cylinders 16, 17 are arranged between the lever arms. The hydraulic bending cylinders are connected to the lever arms through joint bolts connected to the cylinders and pistons of the bending cylinders.

Figure 4:
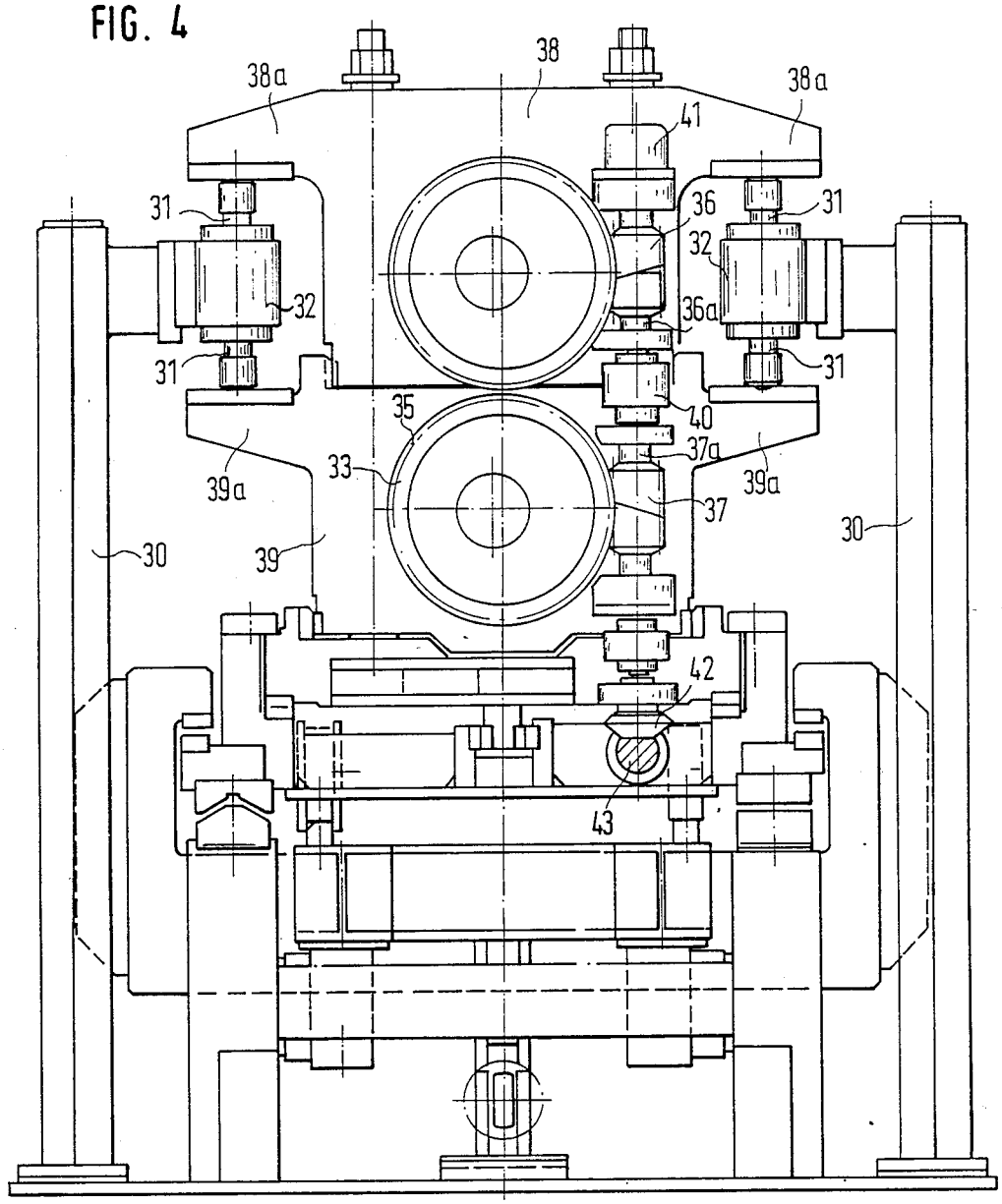
FIG. 4 is a side view of another embodiment of slitting shears according to the present invention.

As lllustrated in FIG. 4, the bending cylinders 32 may also be mounted between lever arms 38a and 39a of chocks 38, 39 on stationary supports 30. In this case, each cylinder is provided with two piston rods which are movable in opposite directions inwardly and outwardly of the respective cylinder.

As illustrated in FIG. 1, the chocks 14, 15 on the service side are movably guided on a swingable platform 20. Platform 20 is swingable about an axis 21 of the machine bed 10. The lower chock 15 rests on an interrupted support surface 22 which is in alignment with the interrupted support surface 23 of machine bed 10 when the form 20 is swung by 90° in the direction of arrow A illustrated in FIG. 1.

The platform 20 is swung by means of a hydraulic cylinder 24 which acts on a swing lever 25 of axis 21. Axis 21 is located laterally opposite the vertical middle plane of the knife rollers 5, 6, so that, in the illustrated swung-away position, the platform 20 extends outside of the vertical middle plane of the knife rollers.

Figure 2:
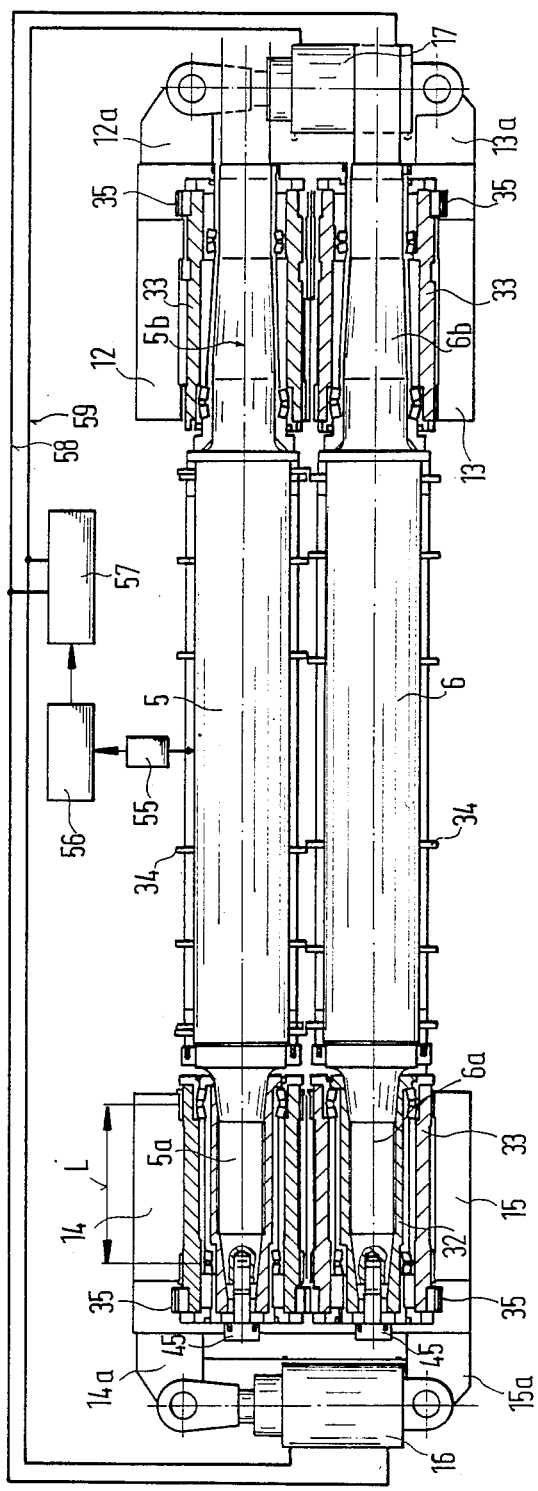
FIG. 2 is a vertical sectional view of the slitting shears of FIG. 1, taken through the center axes of the knife rollers.

FIG. 2 of the drawing shows the support of the knife rollers 5, 6 through the roller necks 5a, 6b in anti-friction bearings which require a defined bearing length L for transmitting the bending moments from the bending cylinders 16, 17 to the knife rollers. Accordingly, the knife roller necks are tightly clamped in the chocks. While inner rings of the anti-friction bearings are directly placed on the knife roller necks 5b, 6b within the chocks 12, 13 on the drive side, inner sleeves 32 are provided on the service side, wherein the inner sleeves 32 form a structural unit with outer eccentric bushings 33 which can be removed from the knife roller necks 5a, 6a on the service side by displacing the chocks 14, 15. For clarity's sake, inner sleeves 32 and eccentric bushings 33 are denoted with reference numerals in FIG. 2 only in connection with knife roller neck 6a. Of course, outer rings of the anti-friction bearings are placed on the drive side also in eccentric bushings 33, because the knife rollers 5, 6 are adjustable in the illustrated embodiment through eccentric bushings which are rotatable in the chocks, as shall be described in detail below.

For effecting the adjustment of the knife rollers 5, 6 and, thus, of the overlap of the circular knives 34, the eccentric bushings 33 are provided with gear rings 35, pairs of which are in engagement with each other. As can be seen in the embodiment according to FIG. 4, which differs from the one shown in FIG. 1 with respect to the construction of the chocks, the gear rings 35 mesh with vertically extending upper and lower adjusting screws 36, 37 which are supported aligned in the chocks 38, 39. The screw shafts 36a, 37a of chocks 38, 39 are movably coupled through coupling sleeves 40, since chocks which are arranged one above the other carry out tilting motions under the influence of the bending cylinders.

As is evident from the single gear motor 41 illustrated in FIGS. 1 and 4, the adjusting screws 36, 37 are driven in all embodiments from one side of the knife rollers.

For operating the eccentric bushings 33 within the chocks 14, 15 on the service side by means of the single gear motor 41 arranged on the knife side, the lower adjusting screw 37 as seen in FIG. 4 is connected through bevel gears 42 to a longitudinal shaft 43 which extends parallel to knife rollers 5, 6, as can be seen in FIG. 1. The longitudinal shaft 43 has at its free end a multiple-groove toothing 43a which engages a coupling sleeve 44 in the lower chock 15 when the platform 20 has been swung in the direction of arrow A and the chocks 14, 15 are slid onto the stationary support surfaces 23; as this occurs, the knife roller necks 5a, 6a are inserted into the inner bushing 32, as can be seen in FIG. 2.

As FIG. 2 further shows, knife roller necks 5a, 6a are clamped within the inner sleeves 32 by means of screws 45 at the end faces. As is true with respect longitudinal shaft 43 in FIG. 4, coupling sleeve 44 is connected through bevel gears to the aligned drive screws, not shown, within the chocks 14, 15 on the service side, so that the adjustment of the knife rollers 5, 6 takes place synchronously on both sides of the knife rollers when the longitudinal shaft 43 is coupled with the coupling sleeve 44 by the sliding motions of the chocks 14, 15 by utilizing a single adjusting gear motor 41 on the drive side.

Figure 3:
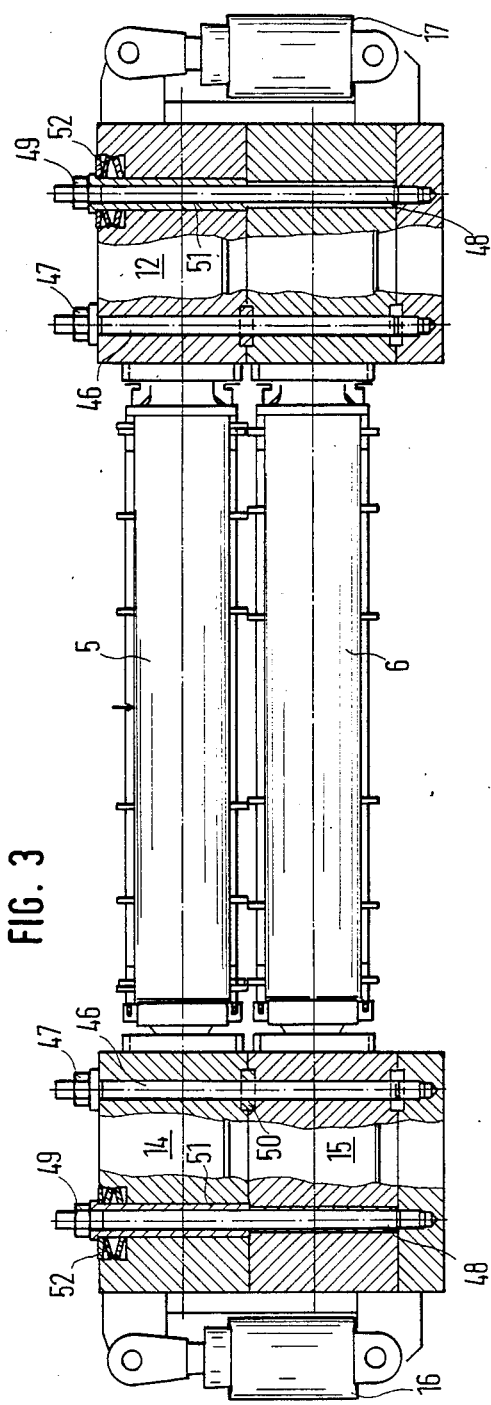
FIG. 3 is a vertical sectional view of the slitting shears of FIG. 1, taken through the vertical planes of the tension rods connecting the chocks of the slitting shears.

The tension-proof connection of chocks which are located one above the other for the transmission of positive bending moments in order to carry out tilting motions shall now be explained with the aid of FIG. 3. The bending moments are considered positive if the knife rollers 5, 6 are bent inwardly under the spreading force of the bending cylinders 16, 17, i.e., they are bent against the outward bending during operation of the rollers. The tension-proof connection of chocks 12, 13 or 14, 15 is effected by means of two pairs each of tension rods 46, with tension nuts 47 and pretensioned tension rods 48 with tension nuts 49. The tension rods are arranged in accordance with the positions of the tension nuts illustrated in FIG. 1.

The tension rods 46 arranged at the greatest distance from the corresponding power units or bending cylinders 16, 17 extend through a spacer piece 50 arranged between the chocks. The spacer piece 50 is spherically-shaped and, thus, permits joint-type tilting motions of the chocks when the spreading force of the bending cylinders 16, 17 is applied. The tension rods 48 arranged at the shorter distance from the corresponding bending cylinders can be pretensioned by means of tension nuts 49, wherein the tension force of the nuts 49 is introduced directly into the lower chocks 13 or 15 through pressure sleeves 51. However, the tension rods extend at the upper ends thereof through compression springs 52 which are provided between the upper chocks 12 or 14 and the tension nut 49 of each tension rod 48.

The slitting shears 1 illustrated in FIG. 1 operate as follows.

In the swung-out position of the chocks 14, 15 on the service side as illustrated in FIG. 1, sufficient space is available for operating personnel to adjust the desired strip width by removing circular knives 34 and replacing the spacer sleeves located between the circular knives. When the knife rollers are prepared in this manner for a new cutting program, the hydraulic cylinder 24 is actuated in order to swing the platform 20 with the chocks 14, 15 in the direction of arrow A. Subsequently, a hydraulic cylinder, not shown, within the platform 20 is actuated for moving through connection 26 the chocks 14, 15 from the support surfaces 22 onto the aligned stationary support surfaces 23 of the machine bed 10. As a result, the knife roller necks 5a, 6a are inserted into the inner bushings 32, as shown in FIG. 2, and the multiple-groove toothing 43 of the longitudinal shaft 43 is inserted into the coupling sleeve 44. Subsequently, nuts 45 are used for pulling-in and tightening the knife roller necks 5a, 6a in the inner bushings 32 which are provided with conical internal surfaces.

After the knives have been adjusted to the desired strip width, the knife overlap is to be adjusted by actuating the adjusting units. For this purpose, the single gear motor 41 is operated in the desired direction, so that all adjusting screws 36, 37 of the drive side and, through longitudinal shaft 43, the corresponding adjusting screws on the service side are rotated. As a consequence, the eccentric bushings 33 in which the knife roller necks are eccentrically supported are also rotated as shown in FIG. 4. In order to maintain the knife shafts which are adjusted always in the vertical middle plane, the adjusting screws 36, 37 have oppositely directed threads, so that the eccentric bushings 33 are also rotated in opposite directions.

Prior to or during the operation of the slitting shears, pressure is applied to the bending cylinders 16, 17, so that they exert a spreading force. Through the fixed clamping of the knife roller necks within the chocks along a sufficiently long defined bearing length L, positive bending moments are applied to the knife rollers 5, 6. These bending moments maintain constant the knife overlap during the cutting particularly of the circular knives located in the middle portion of the knife roller.

As illustrated in FIG. 2, bending of the upper knife roller 5 can be measured by means of a displacement pickup 55. The signals of the displacement pickup 55 are supplied to a control unit 56 which controls a power-assisted valve 57. Valve 57 is connected to bending cylinder 16, 17 through lines 58, 59. As a result, the outward bending of the knife rollers due to operation can be compensated in a controlled manner and the preadjusted knife overlaps remain unchanged. Accordingly, cut edges without burrs can always be produced independently of the cutting forces.

The tilting motions of the chocks resulting from the spreading force of the bending cylinder 16, 17 are possible in spite of the tension-proof connection between these chocks by means of the pairs of tension rods 46 and 48 because the spacer pieces 50 act as axes for the tilting motions and lifting of the chocks in the region of the pretensioned tension rod 48 by the compression spring 52 is possible.

While specific embodiments of the invention have been shown and described in detail to illustrate the application of the inventive principles, it will be understood that the invention may be embodied otherwise without departing from such principles.

We claim:

1. Slitting shears for sheets and strips of metal, the shears comprising adjacently arranged knife rollers which support circular knives, wherein the circular knives of adjacent knife rollers overlap and gaps are defined between the circular knives of each knife roller, the knife rollers being adjustable for adjusting the overlap of the knives, the gaps between knives being adjustable by means of spacer sleeves arranged on the roller between the circular knives, the slitting shears further comprising a bending control means for bending the knife rollers for keeping constant the adjusted knife overlap and knife gaps.

2. The slitting shears according to claim 1, wherein the bending control means includes power units for applying bending moments to the knife rollers, the knife rollers having necks, the power units acting directly on the necks of the knife rollers.

3. The slitting shears according to claim 2, wherein the power units are double-acting hydraulic bending cylinders.

4. The slitting shears according to claim 1, wherein the knife rollers include necks, the slitting shears including chocks arranged one above the other for receiving the necks of the knife rollers, and power units acting through lever arms on the chocks, wherein the necks of the knife rollers are fixedly clamped in the chocks for the transmission of bending moments along a defined length.

5. The slitting shears according to claim 4, wherein the power units are double-acting hydraulic cylinders.

6. The slitting shears according to claim 5, wherein the bending cylinders include cylinders and piston rods, the bending cylinders being connected to the lever arms of the chocks arranged one above the other through joint bolts connected to the cylinders and the piston rods.

7. The slitting shears according to claim 5, wherein the bending cylinders include two piston rods each of which are movable in opposite directions inwardly and outwardly of the cylinder, the piston rods being connected to the lever arms of the chocks arranged one above the other.

8. The slitting shears according to claim 4, comprising two vertically extending adjusting spindles having oppositely directed threads, the knife rollers being adjustable by means of the adjusting spindles, a female thread of the adjusting spindles being arranged in chocks located one above the other at as great a distance as possible from the corresponding power units.

9. The slitting shears according to claim 4, comprising eccentric bushings rotatably mounted in the chocks, the knife rollers being adjustable by means of the eccentric bushings, wherein chocks located one above the other are connected to each other in a tension-proof or compression-proof manner, so that the chocks can carry out tilting motions for transmitting positive or negative bending moments.

10. The slitting shears according to claim 9, wherein two pairs of tension rods are provided for effecting the tension-proof connection, wherein one of the pairs of tension rods is located at a greater distance from the corresponding power units and the other of the pairs of tension rods is located at a shorter distance from the corresponding power units, at least one spacer piece permitting the tilting motions being provided between the chocks in the area of the tension rods arranged at the greatest distance from the corresponding power units, and the tension rods arranged at the shortest distance from the corresponding power units extending with an end thereof through a compression spring arranged between one of the chocks and a clamping nut of each tension rod.

11. The slitting shears according to claim 9, wherein the eccentric bushings are provided with gear rings, the gear rings meshing with vertically extending upper and lower adjusting screws mounted aligned in the chocks arranged one above the other, the adjusting screws of chocks arranged one above the other being movably coupled to each other.

12. The slitting shears according to claim 11, comprising a motor for driving the adjusting screws on a first side of the knife rollers, a longitudinal shaft being connected through bevel gears to a lower adjusting screw of the adjusting screws on the first side of the knife rollers, the longitudinal shaft also being connected through bevel gears to a lower adjusting screw on a second side of the knife rollers.

13. The slitting shears according to claim 12, wherein the slitting shears have a service side and a drive side, the chocks on the service side including bearings for the chocks being horizontally slidable by a distance sufficient for enclosing the necks of the knife rollers, the motor being arranged on the drive side of the knife rollers, and the longitudinal shaft having on the end at the service side a multiple-groove toothing which can be coupled with and uncoupled from a coupling sleeve in the lower chock as a result of the sliding motions of the chocks.

14. The slitting shears according to claim 13, comprising a machine frame with a stationary support surface, the chocks on the service side being slidably guided on a platform, the platform being swingable between a first position and a second position, the platform having a support surface, wherein the support surface of the platform is in alignment with the stationary support surface of the machine frame in the first position of the platform, and wherein the support surface of the platform is located outside of the vertical middle plane of the knife rollers in the second position of the platform swung by 90° relative to the first position.

15. The slitting shears according to claim 1, comprising a displacement pick-up for determining the bending of one of the knife rollers, and a control unit for carrying out a controlled compensation of the bending of the knife rollers.

* * * * *